F B. MORSE.
Carriage Step.

No. 101,150. Patented March 22, 1870.

United States Patent Office.

F. B. MORSE, OF PLANTSVILLE, CONNECTICUT, ASSIGNOR TO HIMSELF AND H. D. SMITH & CO., OF SAME PLACE.

Letters Patent No. 101,150, dated March 22, 1870; antedated February 22, 1870.

IMPROVEMENT IN CARRIAGE-STEPS.

The Schedule referred to in these Letters Patent and making part of the same.

*To all whom it may concern:*

Be it known that I, F. B. MORSE, of Plantsville, in the county of Hartford and State of Connecticut, have invented a new Improvement in Carriage-Steps; and I do hereby declare the following, when taken in connection with the accompanying drawings and letters of reference marked thereon, to be a full, clear, and exact description of the same, and which said drawings constitute part of this specification, and represent in—

Figure 1:
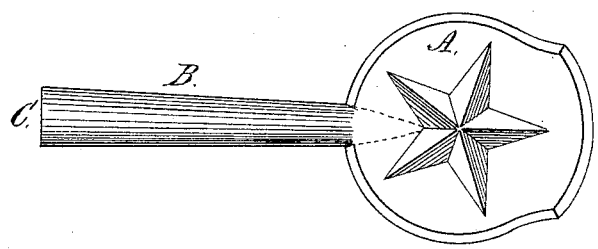

Figure 1, a top view; and in

Figure 2:

Figure 2, a longitudinal central section.

This invention relates to an improvement carriage-steps as an article of manufacture.

Heretofore, steps have usually been formed by blacksmiths in carriage factories, but it is well known to all persons familiar with the manufacture of articles by labor-saving machines that much expense is saved when such articles are made in quantities. To so manufacture carriage-steps is the object of my invention, which consists in the formation of the step from a plate of metal having its surface roughened or raised by the impression of any regular design thereon, and such plate welded to a stem of the required size at the step proper.

A is the step, which may be of any desirable shape; is formed from a plate of metal first cut to the required form.

This plate is welded to a rod, B, the said rod extending upon the under surface of the plate, as denoted in broken lines, and when so welded and the plate heated, the plate is placed between suitable dies to form the edge and emboss or raise the upper surface, as denoted in fig. 2.

This embossing may be of any suitable design, here represented as a star, which from its form gives the best effect.

The rod B I usually make four to five inches in length, and enlarge the end, as at C, so that a suitable amount of material is at that point to enable the smith making the step to weld the rod to its extension without upsetting. Thus I construct the carriage-step complete in itself as an article of manufacture, and am, by so producing the step, enabled to give to carriage manufacturers a better and more ornamental step than they have heretofore produced, and at much less cost.

I claim as my invention—

As a new article of manufacture, carriage-steps embossed as described, and provided with a rod, B, for the purpose of welding, as herein set forth and described.

F. B. MORSE.

Witnesses:
J. H. SHUMWAY,
A. J. TIBBITS.